(12) United States Patent
Ura

(10) Patent No.: US 6,882,163 B2
(45) Date of Patent: Apr. 19, 2005

(54) MEASURED VALUE DETECTING DEVICE

(75) Inventor: Noritake Ura, Anjo (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/423,003

(22) Filed: Apr. 25, 2003

(65) Prior Publication Data
US 2004/0017206 A1 Jan. 29, 2004

(30) Foreign Application Priority Data

Apr. 25, 2002 (JP) ........................... 2002-124512

(51) Int. Cl.[7] ............... G01R 27/28; G01R 31/08; H01F 5/00
(52) U.S. Cl. ................. 324/656; 324/207.15; 324/523
(58) Field of Search ................ 324/523, 207.15, 324/207.16, 207.17, 656, 654–659; 318/605, 659, 660, 661

(56) References Cited

U.S. PATENT DOCUMENTS 5,708,344 A * 1/1998 Hayashi et al. ............. 318/605
6,577,957 B1 * 6/2003 Fujimoto et al. ............. 702/36

FOREIGN PATENT DOCUMENTS

| JP | 403056819 | * 3/1991 |
|---|---|---|
| JP | 2001-082982 | 3/2001 |

* cited by examiner

Primary Examiner—N. Le
Assistant Examiner—Jeff Natalini
(74) Attorney, Agent, or Firm—Oblon, Spivak, McClelland, Maier & Neustadt, P.C.

(57) ABSTRACT

A measured value detecting apparatus includes a measuring unit possessing a winding coil capable of generating an output signal corresponding to a measured value and independent of a direct-current component, a detecting unit possessing a receiving unit for receiving the output signal and determining the measured value based upon the output signal received by the receiving unit, an output transmitting line for transmitting the output signal from the measuring unit to the detecting unit, a potential offsetting means for changing the direct-current component of the output signal on the output transmitting line, and a malfunction detecting means for detecting malfunction of the output transmitting line based upon the direct-current component of the output signal.

15 Claims, 3 Drawing Sheets

Prior Art

US 6,882,163 B2

MEASURED VALUE DETECTING DEVICE

CROSS REFERENCE TO RELATED APPLICATIONS

This application is based on and claims priority under 35 U.S.C. § 119 with respect to a Japanese Patent Application 2002-124512, filed on Apr. 25, 2002, the entire content of which is incorporated herein by reference.

FIELD OF THE INVENTION

This invention generally relates to a measured value detecting device which is provided with a measuring unit for generating an output signal and a detecting unit for detecting a measured value based upon the output signal. The output signal is independent of a direct-current component, such as a cycle in rectangular wave, amplitude in sine wave, or the like. More particularly, this invention pertains to detection of malfunction of an output transmitting line for transmitting the output signal generated from the measuring unit to the detecting unit.

BACKGROUND OF THE INVENTION

As seen in FIG. 3, an angle detecting device 9 having a resolver has been conventionally known as one of measured value detecting devices for detecting a measured value based upon an output signal which is independent of a direct-current component. The angle detecting device 9 includes a measuring unit 10 and a detecting unit 20 which are interconnected via an excitation line 51, output transmitting lines 52, 53, and a reference potential line 54. The measuring unit 10 houses a monophasic excitation and biphasic output type (1 phase/2 phase) of resolver possessing a pair of two secondary winding coils 18, 19, and an excitation coil 17. The excitation coil 17 is fixed to a rotor (not shown) rotatable relatively to the secondary coils 18 and 19.

One end of the excitation coil 17 is connected to a ground (hereinafter, referred to as a GND) housed in the detecting unit 20 via the reference potential line 54 and the other end thereof is connected to an excitation signal generating circuit 21 housed in the detecting unit 20 via the excitation line 51. The excitation signal generating circuit 21 is connected to a central processing unit (hereinafter, referred to as a CPU) 22 housed in the detecting unit 20 and receives a command signal from the CPU 22. One ends of the respective secondary coils 18 and 19 are connected to the GND via the reference potential line 54, so that an output reference potential for each coil 18 and 19 is set at zero volts. The other ends of the respective secondary coils 18 and 19 are connected to the output transmitting lines 52 and 53 so as to individually transmit output signals therefrom to the detecting unit 20.

An excitation signal EX is transmitted from the excitation signal generating circuit 21 to the excitation coil 17 based upon the command from the CPU 22. Magnetic field is created in response to electric excitation of the excitation coil 17 applied with the excitation signal EX. Thereby, output signals SS and SC are electrically induced in the secondary coils 18 and 19, respectively. Both of the output signals SS and SC are sine waves, each of which central value is zero volts and amplitude coefficient is $SIN\theta$ and $COS\theta$ corresponding to a rotational angle $\theta$ of the rotor. The output signal SS is denoted with "$D \cdot SIN\theta \cdot SIN\omega t$" and the output signal SC is denoted with "$D \cdot COS\theta \cdot SIN\omega t$". The constant numerical "D" is determined based upon a temperature, the amplitude of the excitation signal EX, and the like.

The output signal SS is transmitted to the detecting unit 20 via the output transmitting line 52 so that the central value of the output signal SS with the sine wave varies by resistances R91, R92, and a detecting reference potential V1. The output signal SS is then amplified by a non-inverting amplifying circuit including resistances R93, R94, and an operational amplifier 93. For example, in the case that the detecting unit 20 is provided with the resistance R91 with 5 kΩ, the resistance R92 with 20 kΩ, and the detecting reference potential V1 with 2.5v, the central value at zero volts is changed up to 0.5 volts. The output signal SS is then amplified by the non-inverting amplifying circuit and the central value thereof is changed up to 2.5 volts in the case that the non-inverting amplifying circuit has a gain set to be 5.

The output signal SC is transmitted to the detecting unit 20 via the output transmitting line 53 so that the central value of the output signal SC with the sine wave is changed by resistances R95, R96, and the detecting reference potential V1. The output signal is then amplified by a non-inverting amplifying circuit including resistances R97, R98, and an operational amplifier 94. For example, in the case that the detecting unit 20 is provided with the resistance R95 with 5 kΩ, the resistance R96 with 20 kΩ, and the detecting reference potential V1 with 2.5 volts, the central value of zero volts is changed up to 0.5 volts. The output signal SC is then amplified by the non-inverting amplifying circuit and the central value thereof is changed up to 2.5 volts in the case that the non-inverting amplifying circuit has a gain set to be 5.

The amplified output signals SS and SC are received and converted to digital values by an analog-digital converter 29, which is a known receiving unit. The CPU 22 calculates the rotational angle $\theta$ of the rotor based upon the digital values.

However, according to the above-described known angle detecting device 9, when the rotational angle $\theta$ of the rotor is zero degree, the $SIN\theta$ is zero so that an amplitude $D \cdot SIN\theta$ of the output signal SS will result in zero as well. That is, the output signal SS is zero volts. In this case, it may not have been possible to detect a short-circuit between the output transmitting line 52 for transmitting the output signal SS and the reference potential line 54.

Further, there can be a case that the value of the output signal SS can be the same as the value of the output signal SC depending on a rotational angle $\theta$ of the rotor. In this case, it may not have been also possible to detect a short-circuit between the two output signal transmitting lines. Still further, in the case that tie measuring unit can be provided with a plurality pairs of the excitation coil and the secondary coils, output signals on respective plural output transmitting lines can be the same as one another with a high potentiality, thereby short-circuit between the output transmitting lines may not be able to be properly detected.

The present invention therefore seeks to provide an improved angle detecting device surely capable of detecting a short-circuit between an output transmitting line and a reference potential line and a short-circuit between output transmitting lines independently of a rotational angle $\theta$ of a rotor.

SUMMARY OF THE INVENTION

According to an aspect of the present invention, a measured value detecting apparatus includes a measuring unit possessing a winding coil capable of generating an output signal corresponding to a measured value and independent of a direct-current component, a detecting unit possessing a receiving unit for receiving the output signal and determining the measured value based upon the output signal received by the receiving unit, an output transmitting line for transmitting the output signal from the measuring unit to the detecting unit, a potential offsetting means for changing the direct-current component of the output signal on the output transmitting line, and a malfunction detecting means for detecting malfunction of the output transmitting line based upon the direct-current component of the output signal.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Embodiments of the present invention will be described hereinbelow in detail with reference to the accompanying drawings.

Figure 1:
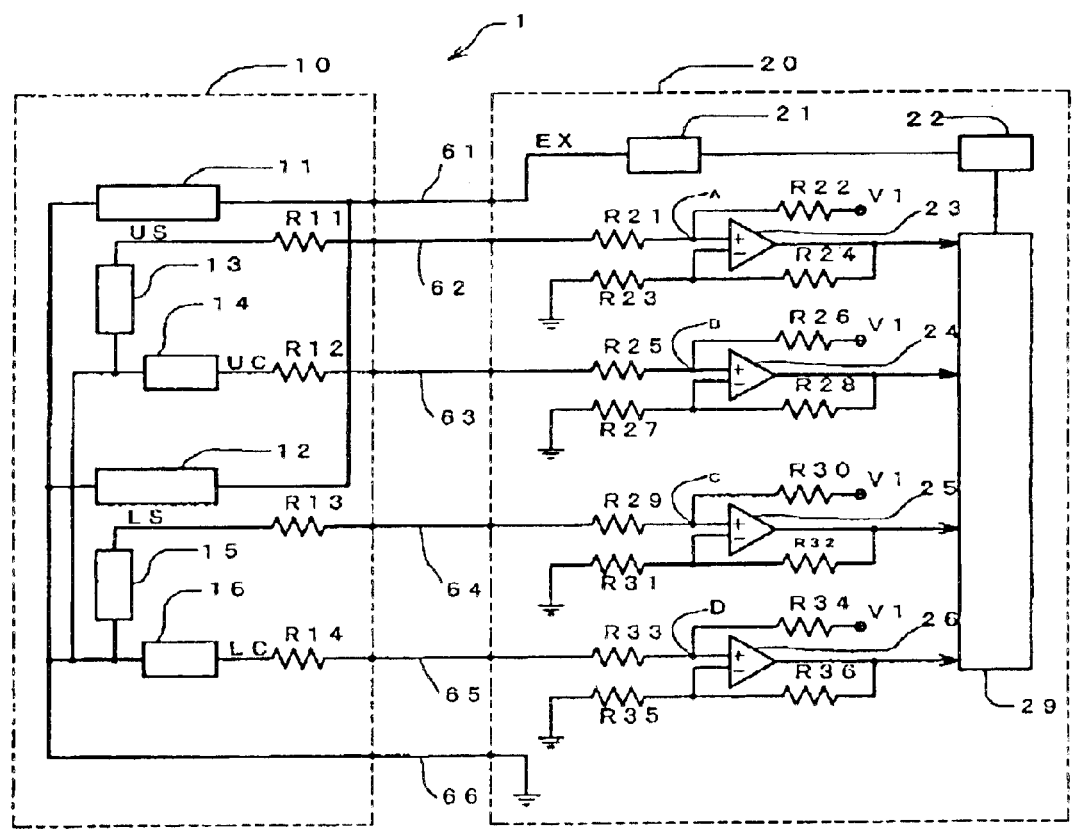
FIG. 1 is a block diagram illustrating a configuration of an angle detecting device as a measured value detecting device according to a first embodiment of the present invention.

As illustrated in FIG. 1, an angle detecting device 1 according to a first embodiment of the present invention is provided with a measuring unit 10 and a detecting unit 20 which are interconnected to each other via an excitation line 61, output transmitting lines 62, 63, 64, 65, and a reference potential line 66. The measuring unit 10 houses a monophasic excitation and biphasic output type of resolver (i.e. a first resolver) possessing a pair of two secondary winding coils 13, 14, and an excitation coil 11 and the same type of resolver (i.e. a second resolver) possessing a pair of two secondary winding coils 15, 16, and an excitation coil 12. The excitation coil 11 is fixed to a rotor (not shown) rotatable relative to the secondary coils 13, 14 and the excitation coil 12 is fixed to a rotor (not shown) rotatable relative to the secondary coils 15, and 16.

One ends of the respective excitation coils 11 and 12 are interconnected to each other in the measuring unit 10 and are connected to an excitation signal generating circuit 21 housed in the detecting unit 20 via the excitation line 61. The excitation signal generating circuit 21 is connected to the CPU 22 housed in the detecting unit 20 so as to receive a command from the CPU 22.
The other ends of the respective excitation coils 11 and 12 are connected to a ground (i.e. a GND) of the detecting unit 20 via the reference potential line 66. In the meantime, one ends of the respective secondary coils 13, 14, 15, and 16 are connected to the output transmitting lines 62, 63, 64, and 65, all of which extend into the detecting unit 20, thereby capable of independently transmitting respective output signals issued from the coils 13, 14, 15, and 16 to the detecting unit 20. The other ends of the secondary coils 13, 14, 15, and 16 are connected to the GND via the reference potential line 66. According to the first embodiment of the present invention, an output reference potential is set at zero volts by connecting the reference potential line 66 to the GND.

An alternating-current excitation signal EX generated by the excitation signal generating circuit 21 based upon the command from the CPU 22 is transmitted to the excitation coil 11 of the first resolver and the excitation coil 12 of the second resolver. The excitation coil 11 is applied with the excitation signal EX with sine wave so as to be electrically excited. Output signals US and UC are then induced in the secondary coils 13 and 14 of the first resolver in response to the electric excitation of the excitation coil 11. In the same manner, output signals LS and LC are induced in the secondary coils 15 and 16 of the second resolver in response to electric excitation of the excitation coil 12.

Each output signal US and UC is sine wave of which central value (i.e. a direct-current component) is zero volts, and of which amplitude coefficient is $SIN\theta1$ corresponding to a rotational angle $\theta1$ of the rotor and $COS\theta1$ corresponding thereto. The output signal US is denoted with "$A \cdot SIN\theta1 \cdot SIN\omega t$" and the output signal UC is denoted with "$A \cdot COS\theta1 \cdot SIN\omega t$". Each of output signal LS and LC is sine wave of which central value (i.e. a direct-current component) is zero volts, and of which amplitude coefficient is $SIN\theta2$ corresponding to a rotational angle $\theta2$ of the rotor and $COS\theta2$ corresponding thereto. The output signal LS is denoted with "$B \cdot SIN\theta2 \cdot SIN\omega t$" and the output signal LC is denoted with "$B \cdot COS\theta2 \cdot SIN\omega t$".

The output signal US is amplified via a first resistor element R11 (i.e. a potential offsetting means) housed in the measuring unit 10, the output transmitting line 62, a second resistor element R21 (i.e. the potential offsetting means) housed in the detecting unit 20, a connecting point A, and an operational amplifier 23. The connecting point A is connected with a resistance R22 and a detecting reference potential V1 (i.e. the potential offsetting means). The operational amplifier 23 forms a non-inverting amplifying circuit along with resistor elements R23 and R24. The output signal UC is amplified via a first resistor element R12 (i.e. the potential offsetting means) housed in the measuring unit 10, the output transmitting line 63, a second resistor element R25 (i.e. the potential offsetting means) housed in the detecting unit 20, a connecting point B, and an operational amplifier 24. The connecting point B is connected with a resistance R26 and the detecting reference potential V1 (i.e. the potential offsetting means). The operational amplifier 24 forms a non-inverting amplifying circuit along with resistor elements R27 and R28.

The output signal LS is amplified via a first resistor element R13 (i.e. the potential offsetting means) housed in the measuring unit 10, the output transmitting line 64, a second resistor element 29 (i.e. the potential offsetting means) housed in the detecting unit 20, a connecting point C, and an operational amplifier 25. The connecting point C is connected with a resistance R30 and the detecting reference potential V1 (i.e. the potential offsetting means). The operational amplifier 25 forms a non-inverting amplifying circuit along with resistor elements R31 and R32. The output signal LC is amplified via a first resistor element R14 (i.e. the potential offsetting means) housed in the measuring unit 10, the output transmitting line 65, a second resistor element R33 (i.e. the potential offsetting means) hosed in the detecting unit 20, a connecting point D, and an operational amplifier 26. The connecting point D is connected with a resistance R34 and the detecting reference potential V1 (i.e. the potential offsetting means). The operational amplifier 26 forms a non-inverting amplifying circuit along with resistor elements R35 and R36.

The amplified output signals US, UC, LS, and LC are received by an analog-digital converter 29 as a receiving unit and are converted to digital values thereby. The CPU 22 calculates the rotational angle θ1 of the rotor for the first resolver and the rotational angle θ2 of the rotor for the second resolver with reference to the digital values. The CPU 22 further calculates a sum of each output signal US, UC, LS and LC per a constant time and calculates a central value of each output signal. Therefore, the CPU 22 can monitor a variation of the central value of each output signal US, UC, LS, and LC.

TABLE 1

| Reference Number | Value |
|---|---|
| R11 | 1 kΩ |
| R12 | 2 kΩ |
| R13 | 3 kΩ |
| R14 | 4 kΩ |
| R21 | 4 kΩ |
| R25 | 3 kΩ |
| R29 | 2 kΩ |
| R33 | 1 kΩ |
| R22, R24, R26, R28, R30, R32, R34, R36 | 20 kΩ |
| R23, R27, R31, R35 | 5 kΩ |
| V1 | 2.5 V |

Table 1 shows a predetermined resistance value of each resistance R11 through R14, R21 through R36, and a value of the detecting reference potential V1.

Next, a following description will be given for explaining signal transmission under a normal condition in which there is no short-circuit associated with each output transmitting line 62, 63, 64, and 65.

The excitation signal generating circuit 21 transmits the excitation signal EX to the excitation coils 11 and 12 in response to the command from the CPU 22. The output signals US and UC, both of which correspond to the rotational angle θ1 of the rotor for the first resolver, are respectively induced in the secondary coils 13 and 14 in response to the electric excitation of the excitation coil 11 applied with the excitation signal EX. In the meantime, the output signals LS and LC, both of which correspond to the rotational angle θ2 of the rotor for the second resolver, are respectively induced in the secondary coils 15 and 16 in response to the electric excitation of the excitation coil 12 applied with the excitation signal EX.

The central value of the output signal US varies when the output signal US goes through the first resistor element R11, the second resistor element R21, the resistance R22, and the detecting reference potential V1. The central value of the output signal US with the sine wave is zero volts between the secondary coil 13 and the first resistor element R11, is changed up to 0.4 volts on the output transmitting line 62, and 0.5 volts between the second resistor element R21 and the operational amplifier 23. The output signal US is amplified by the operational amplifier 23 along with the resistances R23 and R24 so that the central value thereof is changed up to 2.5 volts.

The central value of the output signal UC varies when the output signal UC goes through the first resistor element R12, the second resistor element R25, the resistance R26, and the detecting reference potential V1. The central value of the output signal UC with the sine wave is zero volts between the secondary coil 14 and the resistor element R12, is changed up to 0.3 volts on the output transmitting line 63, and 0.5 volts between the second resistor element R25 and the operational amplifier 24. The output signal US is amplified by the operational amplifier 24 along with the resis-tances R27 and R28 so that the central value thereof is changed up to 2.5 volts.

The central value of the output signal LS varies when the output signal LS goes through the first resistor element R13, the second resistor element R29, the resistance R30, and the detecting reference potential V1. The central value of the output signal LS with the sine wave is zero volts between the secondary coil 15 and the first resistor element R13, is changed up to 0.2 volts on the output transmitting line 64, and 0.5 volts between the second resistor element R29 and the operational amplifier 25. The output signal LS is amplified by the operational amplifier 25 along with the resistances R31 and R32 so that the central value thereof is changed up to 2.5 volts.

The central value of the output signal LC varies when the output signal LC goes through the first resistor element R14, the second resistor element R33, the resistance R34, and the detecting reference potential V1. The central value of the output signal LC with the sine wave is zero volts between the secondary coil 16 and the first resistor element R14, is changed up to 0.1 volts on the second transmitting line 65, 0.5 volts between the second resistor element R33 and the operational amplifier 26. The output signal LS is amplified by the operational amplifier 26 along with the resistances R35 and R36 so that the central value thereof is changed up to 2.5 volts.

As described above, each output signal US, UC, LS, and LC will be a sine wave, of which central value is 2.5 volts, when there is no short-circuit associated with each output transmitting line 62, 63, 64, and 65.

Next, the following description will be given for explaining the change of the central values of the output signals when the output transmitting lines are short-circuited.

When the output transmitting line 62 for transmitting the output signal US and the output transmitting line 63 for transmitting the output signal UC are short-circuited therebetween, a potential at the shorted portion is 0.344 volts. The central value of the output signal US is changed to 0.447 volts at the connecting point A. The output signal US is then amplified by the operational amplifier 23 so that the central value thereof will be 2.24 volts. In the meantime, the central value of the output signal UC is 0.540 volts at the connecting point B. The output signal UC is then amplified by the operational amplifier 24 so that the central value thereof will be 2.70 volts.

Further, when the output transmitting line 62 for transmitting the output signal US and the reference potential line 66 become short-circuited therebetween, the potential at the short-circuited portion will be zero volts. The central value of the output signal US becomes 0.119 volts at the connecting point A. The output signal US is then amplified by the operational amplifier 23 so that the central value thereof will be 0.6 volts.

TABLE 2

| Output Signal | Output Transmitting line | Another short-circuited transmitting line | | | | |
|---|---|---|---|---|---|---|
| | | 62 | 63 | 64 | 65 | 66 |
| US | 62 | — | 2.24 | 1.89 | 1.39 | 0.60 |
| UC | 63 | 2.70 | — | 2.23 | 1.84 | 1.14 |
| LS | 64 | 2.81 | 2.68 | — | 2.22 | 1.63 |
| LC | 65 | 2.78 | 2.72 | 2.65 | — | 2.09 |

Table 2 explains the change of the central values of the output signals in accordance with some exemplified pairs of short-circuited output transmitting lines and some exemplified pairs of the short-circuited output transmitting line and the reference potential line. When the central value of each output signal US, UC, LS, and LC, which has been always monitored by the CPU 22, varies as described above, the CPU 22 (i.e. a malfunction detecting means) judges that the output transmitting lines are under the short-circuited conditions.

As described above, when the short-circuit occurs between the output transmitting lines, the central values of the amplified output signals vary no matter which output transmitting lines are short-circuited. Therefore, according to the first embodiment of the present invention, wherever the short-circuit occurs such as between the output transmitting lines, between the output transmitting line and the reference potential line, and the like, any short-circuit can be detected regardless of the measured values of the rotational angles θ1 and θ2 of the rotors by always monitoring the central value of each output signal by the CPU 22.

According to the first embodiment of the present invention, the potential of each output transmitting line 62, 63, 64, and 65 is set to be different from one another so as to detect the short-circuit between the output transmitting lines. Therefore, when only the short-circuit between the output transmitting line and the reference potential line is required to be detected, the resistance value of each first resistor element R11, R12, R13, and R14 can be set equal to one another and the second resistor elements R21, R25, R29, and R33 can be removed from the detecting unit 20.

Next, the following description will be given for explaining an angle detecting device 2 according to a second embodiment of the present invention. The identical elements to the first embodiment are described with the identical reference numerals and the description thereof will be omitted so as to simplify the whole description.

Figure 2:
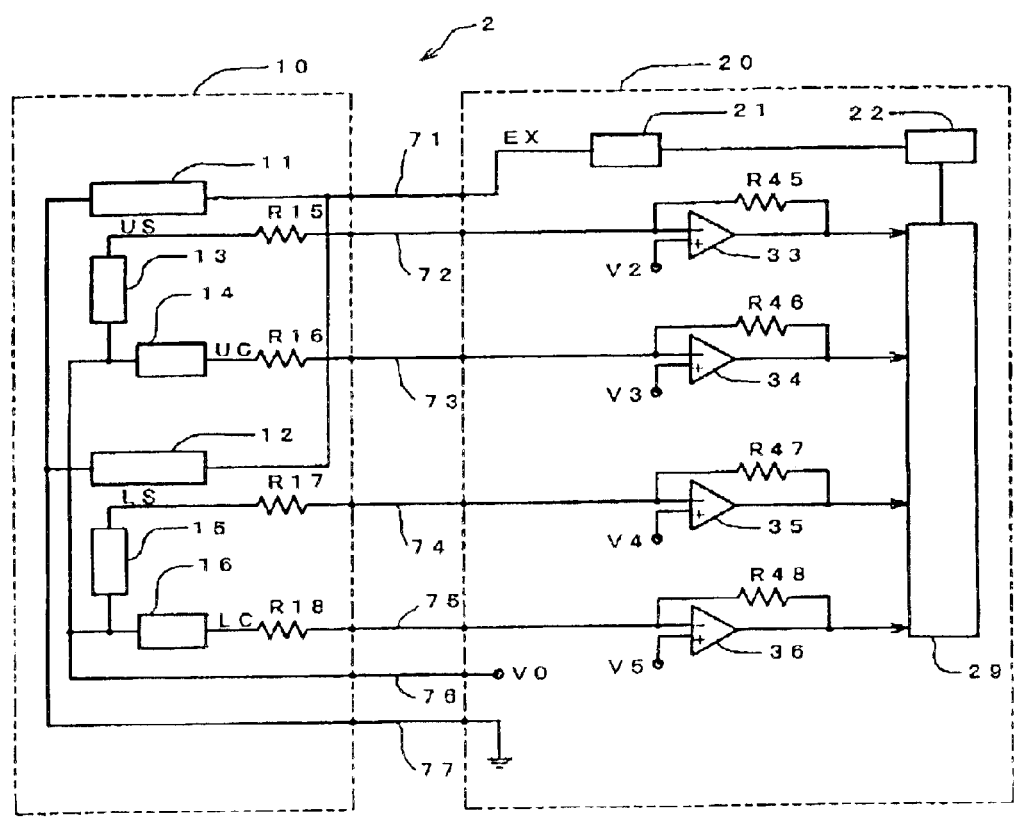
FIG. 2 is a block diagram illustrating a configuration of an angle detecting device as a measured value detecting device according to a second embodiment of the present invention.
Figure 3:
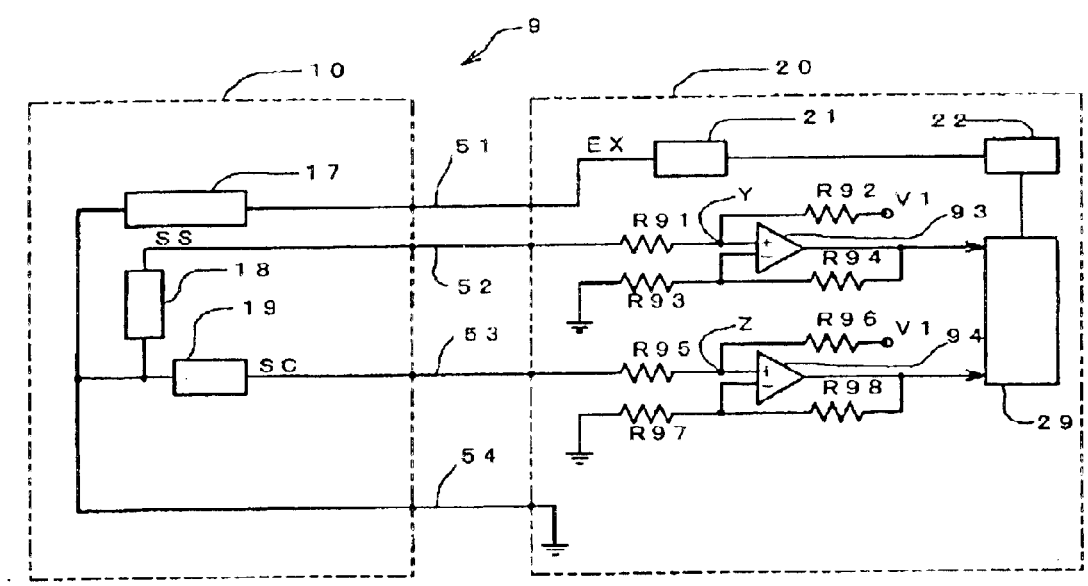
FIG. 3 is a block diagram illustrating a configuration of a known angle detecting device.

As illustrated in FIG. 2, in the same manner as the first embodiment of the present invention, one ends of the excitation coils 11 and 12 are interconnected to each other in the measuring unit 10 and are connected to the excitation signal generating circuit 21 housed in the detecting unit 20 via an excitation line 71. The other ends of the excitation coils 11 and 12 are connected to the GND housed in the detecting unit 20 via a grounded line 77. In the meantime, one ends of the secondary coils 13, 14, 15, and 16 are connected to output transmitting lines 72, 73, 74, and 75 so as to independently transmit the output signals issued from the secondary coils to the detecting unit 20. The other ends of the secondary coils 13, 14, 15, and 16 are connected to an output reference potential V0 via a reference potential line 76.

The output signal US, of which amplitude coefficient is a sine value corresponding to the rotational angle θ1 of the rotor for the first resolver, is induced in the secondary coil 13 in response to electric excitation of excitation coil 11 when the excitation signal EX is applied to the excitation coil 11. The output signal US is transmitted to the analog-digital converter 29 via a first resistor element R15 (i.e. the potential offsetting means) housed in the measuring unit 10, the output transmitting line 72, and an operational amplifier 33 (i.e. the potential offsetting means) housed in the detecting unit 20. The operational amplifier 33 forms an inverting amplifying circuit along with the first resistor element R15 and a third resistor element R45 (i.e. the potential offsetting means). A positive input (non-inverting input) of the operational amplifier 33 is connected to an amplifying reference potential V2.

The output signal UC, of which amplitude coefficient is a cosine value corresponding to the rotational angle θ1 of the rotor for the first resolver, is induced in the secondary coil 14 in response to electric excitation of excitation coil 11 when the excitation signal EX is applied to the excitation coil 11. The output signal UC is transmitted to the analog-digital converter 29 via a first resistor element R16 (i.e. the potential offsetting means) housed in the measuring unit 10, the output transmitting line 73, an operational amplifier 34 (i.e. the potential offsetting means) housed in the detecting unit 20. The operational amplifier 34 forms an inverting amplifying circuit along with the first resistor clement R16 and a third resistor element R46 (i.e. the potential offsetting means). A positive input (non-inverting input) of the operational amplifier 34 is connected to an amplifying reference potential V3.

The output signal LS, of which amplitude coefficient is a sine value corresponding to the rotational angle θ2 of the rotor for the second resolver, is induced in the secondary coil 15 in response to electric excitation of excitation coil 12 when the excitation signal EX is applied to the excitation coil 12. The output signal LS is transmitted to the analog-digital converter 29 via a first resistor element R17 (i.e. the potential offsetting means) housed in the measuring unit 10, the output transmitting line 74, an operational amplifier 35 (i.e. the potential offsetting means) housed in the detecting unit 20. The operational amplifier 35 forms an inverting amplifying circuit along with the first resistor element R17 and a third resistor element R47 (i.e. the potential offsetting means). A positive input (non-inverting input) of the operational amplifier 35 is connected to an amplifying reference potential V4.

The output signal LC, of which amplitude coefficient is a cosine value corresponding to the rotational angle θ2 of the rotor for the second resolver, is induced in the secondary coil 16 in response to electric excitation of excitation coil 12 when the excitation signal EX is applied to the excitation coil 12. The output signal LC is transmitted to the analog-digital converter 29 via a first resistor element R18 (i.e. the potential offsetting means) housed in the measuring unit 10, the output transmitting line 75, an operational amplifier 36 (i.e. the potential offsetting means) housed in the detecting unit 20. The operational amplifier 36 forms an inverting amplifying circuit along with the first resistor element R18 and a third resistor element R48 (i.e. the potential offsetting means). A positive input (non-inverting input) of the operational amplifier 36 is connected to an amplifying reference potential V5.

TABLE 3

| Reference Number | Value |
| --- | --- |
| R15, R16, R17, R18 | 1 kΩ |
| R45, R46, R47, R48 | 5 kΩ |
| V0 | 2.5 V |
| V2 | 2.6 V |
| V3 | 2.55 V |
| V4 | 2.45 V |
| V5 | 2.4 V |

Table 3 shows a resistance value of each first resistor element R15 through R18, a resistance value of each third resistor element R45 through R48, a value of the output reference potential V0, and a value of each amplifying reference potential V2 through V5.

Next, a following description will be given for explaining signal transmission under a normal condition in which there is no short-circuit associated with each output transmitting lines 72, 73, 74, and 75.

The excitation signal EX is transmitted to the excitation coils 11 and 12 from the excitation signal generating circuit 21 based upon the command from the CPU 22. The output signals US and UC, both of which correspond to the rotational angle θ1 of the rotor for the first resolver, are respectively induced in the secondary coils 13 and 14 in response to the electrical excitation of excitation coil 11 when the excitation signal EX is applied to the excitation coil 11. In the meantime, the output signals LS and LC, both of which correspond to the rotational angle θ2 of the rotor for the second resolver, are respectively induced in the secondary coils 15 and 16 in response to the electrical excitation of excitation coil 12 when the excitation signal EX is applied to the excitation coil 12.

The output signal US with the sine wave is amplified by passing through the inverting amplifying circuit of the first resistor element R15, the second resistor element R45, and the operational amplifier 33, thereby the central value of the output signal US is then changed up to 3.1 volts. In this case, the central value of the output signal US on the output transmitting line 72 is changed up to 2.6 volts by the amplifying reference potential V2 and the operational amplifier 33. The output signal UC is amplified by passing through the inverting amplifying circuit of the first resistor element R16, the second resistor element R46, and the operational amplifier 34, thereby the central value of the output signal UC is then changed up to 2.8 volts. In this case the central value of the output signal UC on the output transmitting line 73 is changed up to 2.55 volts by the amplifying reference potential V3 and the operational amplifier 34.

The output signal LS is amplified by passing through the inverting amplifying circuit of the first resistor element R17, the second resistor element R47, and the operational amplifier 35, thereby the central value of the output signal LS is changed up to 2.2 volts. In this case the central value of the output signal LS on the output transmitting line 74 is changed up to 2.45 volts by the amplifying reference potential V3 and the operational amplifier 35. The output signal LC is amplified by passing through the inverting amplifying circuit of the first resistor element R18, the second resistor element R48, and the operational amplifier 36, thereby the central value of the output signal LC is changed up to 1.9 volts. In this case the central value of the output signal LC on the output transmitting line 75 is changed up to 2.4 volts by the amplifying reference potential V4 and the operational amplifier 36.

As described above, when there is no short-circuit on each output transmitting line, each output signal US, UC, LS, and LC is a sine wave of which central value is 3.1 volts, 2.8 volts, 2.2 volts, and 1.9 volts.

The angle detecting device 2 according to the second embodiment includes the inverting amplifying circuits extending between the measuring unit 10 and the detecting unit 20.

Therefore, when a short-circuit occurs between the output transmitting lines, between the output transmitting line and the reference potential line, or the like, a potential of the positive input (non-inverting input) of the operational amplifier and a potential of a negative input (inverting input) thereof will be off balance, i.e. a potential of the positive input of the operational amplifier becomes substantially equal to a potential of a negative input thereof. In this case, the central value of each amplified output signal becomes 5 volts, which is an upper threshold value capable of being outputted from the operational amplifier, zero volts, which is a lower threshold value capable of being outputted from the operational amplifier, or oscillates between zero volts and 5 volts. That is, the central value of each output signal under the short-circuited condition differs from the central value of each output signal under a normal condition. Therefore, wherever the short-circuit occurs such as between the output transmitting lines, between the output transmitting line and the reference potential line, or the like, the short-circuit can be effectively detected regardless of the rotational angles θ1 and θ2 of the rotor for the first and second resolvers, by always monitoring the variation of the central value of each output signal by the CPU 22.

According to the second embodiment of the present invention, the potentials of the output transmitting lines are set to be different from one another so as to detect the short-circuit between the output transmitting lines. Therefore, when only the short-circuit between the output line transmitting line and the reference potential line is required to be detected, the voltage value of each amplifying reference voltage V2, V3, V4, and V5 can be set at the same value.

According to the above-described preferred embodiments of the present invention, the angle detecting device is provided with the two pairs of the excitation coil and the secondary coil. Alternatively, the angle detecting device can be provided with a pair of the excitation coil and the secondary coil, in which the short-circuit between the output transmitting line and the reference potential line can be reliably detected. Further, the angle detecting device can be provided with three pairs of the excitation coil and the secondary coil, in which the short-circuit between the output transmitting lines and the short-circuit between the output transmitting line and the reference potential line can be reliably detected in the same manner as the first and second embodiments of the present invention.

The described preferred pattern with the resistance values and the preferred potential values according to the embodiments of the present invention is an only example. Therefore, the present invention can be also achieved by employing any other patterns of the resistance values and the potential values as far as the central values of the output signals are different from one another.

The angle detecting device according to the embodiments of the present invention can be applied for a torque detecting apparatus with a known structure.

According to the embodiments of the present invention, the angle detecting device is provided with the monophasic excitation and biphasic output type (1phase/2phase) of resolver. Alternatively, the same effects can be obtained by another angle detecting device provided with a biphasic excitation and monophasic output type (2phase/1phase) of resolver.

According to the embodiments of the present invention, the angle detecting device is provided with the resolver. Alternatively, a measured value detecting device, of which winding coil outputs rectangular wave, can be applicable as far as a measured value is calculated based upon a cycle of the rectangular wave and a central value of the rectangular wave can be offset.

As described above, the measure value detecting device according to the embodiments of the present invention is capable of reliably detecting a short-circuit between the output transmitting lines, between the output transmitting line and the reference potential line, or the like.

The principles, preferred embodiments and mode of operation of the present invention have been described in the foregoing specification. How ever, the invention which is intended to be protected is not to be construed as limited to the particular embodiments disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

I claim:

1. A measured value detecting apparatus comprising:
   a measuring unit possessing a winding coil capable of generating an output signal corresponding to a measured value and independent of a direct-current component;
   a detecting unit possessing a receiving unit for receiving the output signal and determining the measured value based upon the output signal received by the receiving unit;
   an output transmitting line for transmitting the output signal from the measuring unit to the detecting unit;
   a potential offsetting means for providing a direct-current component for the output signal on the output transmitting line; and
   a malfunction detecting means for detecting malfunction of the output transmitting line based upon the direct-current component of the output signal.

2. A measured value detecting device according to claim 1, wherein a one end of the winding coil is connected to the output transmitting line and the other end of the winding coil is connected to a reference potential line connected to an output reference potential housed in the detecting unit.

3. A measured value detecting device according to claim 2, further comprising: a first resistor element disposed between the winding coil and the output transmitting line; and a detecting reference potential connected to a portion between the output transmitting line and the receiving unit, wherein the potential offsetting means includes the first resistor element and the detecting reference potential.

4. A measured value detecting device according to claim 2, further comprising:
   a first resistor element disposed between the winding coil and the output transmitting line;
   an operational amplifier disposed between the output transmitting line and the receiving unit, a negative input of the operational amplifier inputted with the output signal, and a positive input of the operational amplifier inputted with an amplifying reference potential; and
   a third resistor element connected to the operational amplifier to be parallel with the operational amplifier, wherein an inverting amplifying circuit is formed with the first resistor element, the operational amplifier, and the third resistor element on the output transmitting line, as the potential offsetting means.

5. A measured value detecting device according to claim 2, wherein the measuring unit possesses plural winding coils, the one ends of the plural winding coils are respectively connected to the output transmitting lines corresponding to the respective winding coils, and the other ends of the plural winding coils are respectively connected to the reference potential line or the plural reference potential lines corresponding to the respective winding coils.

6. A measured value detecting device according to claim 5, further comprising:
   first resistor elements respectively disposed between the respective winding coils and the respective output transmitting lines; second resistor elements respectively disposed between the respective output transmitting lines and the receiving unit; and
   detecting reference potentials respectively connected to portions between the second resistor elements and the receiving unit, wherein the potential offsetting means is formed by setting resistance values of the first resistor elements to be different from one another, by setting a sum of the resistance value of the first resistor element and a resistance value of the second resistor element on each output transmitting line to be equal to one another, and by setting values of the plural detecting reference potentials to be equal to one another.

7. A measured value detecting device according to claim 5, further comprising:
   first resistor elements respectively disposed between the respective winding coils and the respective output transmitting lines;
   operational amplifiers respectively disposed between the respective output transmitting lines and the receiving unit, negative inputs of the respective operational amplifiers respectively inputted with the output signals, and positive inputs of the respective operational amplifiers respectively inputted with amplifying reference potentials; and
   third resistor elements respectively connected to the operational amplifiers to be parallel with the operational amplifiers, wherein an inverting amplifying circuit is formed with the first resistor element, the operational amplifier, and the third resistor element on each output transmitting line, as the potential offsetting means.

8. A measured value detecting device according to claim 7, wherein values of the respective amplifying reference potentials inputted to the positive inputs of the respective operational amplifiers differ from one another.

9. A measured value detecting device according to claim 2, wherein the measuring unit is provided with a resolver having an excitation coil and a secondary coil, and the winding coil is the secondary coil.

10. A measured value detecting device according to claim 3, wherein the measuring unit is provided with a resolver having an excitation coil and a secondary coil, and the winding coil is the secondary coil.

11. A measured value detecting device according to claim 4, wherein the measuring unit is provided with a resolver having an excitation coil and a secondary coil, and the winding coil is the secondary coil.

12. A measured value detecting device according to claim 5, wherein the measuring unit is provided with a resolver having an excitation coil and a secondary coil, and the winding coil is the secondary coil.

13. A measured value detecting device according to claim 6, wherein the measuring unit is provided with a resolver having an excitation coil and a secondary coil, and the winding coil is the secondary coil.

14. A measured value detecting device according to claim 7, wherein the measuring unit is provided with a resolver having an excitation coil and a secondary coil, and the winding coil is the secondary coil.

15. A measured value detecting device according to claim 8, wherein the measuring unit is provided with a resolver having an excitation coil and a secondary coil, and the winding coil is the secondary coil.

* * * * *